(12) United States Patent
Dick et al.

(10) Patent No.: US 6,973,579 B2
(45) Date of Patent: Dec. 6, 2005

(54) GENERATION OF USER EQUIPMENT IDENTIFICATION SPECIFIC SCRAMBLING CODE FOR THE HIGH SPEED SHARED CONTROL CHANNEL

(75) Inventors: Stephen G. Dick, Nesconset, NY (US); Nader Bolourchi, Larchmont, NY (US); Sung-Hyuk Shin, Fort Lee, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 260 days.

(21) Appl. No.: 10/187,640

(22) Filed: Jul. 1, 2002

(65) Prior Publication Data

US 2003/0210782 A1 Nov. 13, 2003

Related U.S. Application Data

(60) Provisional application No. 60/378,170, filed on May 13, 2002, and provisional application No. 60/378,509, filed on May 7, 2002.

(51) Int. Cl.$^7$ ............................ G06F 11/30; H04K 1/00; H04B 1/69
(52) U.S. Cl. ............................ 713/200; 380/2; 380/210; 375/135; 375/146
(58) Field of Search .......................... 713/200; 380/210, 380/217, 218, 221, 2; 375/135, 136, 141, 145, 146, 147; 370/320, 335, 342, 441, 510

(56) References Cited

U.S. PATENT DOCUMENTS

| | | | |
|---|---|---|---|
| 5,671,218 A | 9/1997 | I et al. ........................ 370/252 |
| 5,799,154 A | 8/1998 | Kuriyan ....................... 709/223 |
| 6,014,567 A | 1/2000 | Budka ......................... 455/453 |
| 6,385,183 B1 | 5/2002 | Takeo .......................... 370/335 |
| 6,493,331 B1 | 12/2002 | Walton et al. ............... 370/341 |
| 6,539,047 B1 * | 3/2003 | Moon .......................... 375/135 |
| 6,567,461 B1 * | 5/2003 | Moon et al. ................. 375/145 |
| 2002/0018565 A1 | 2/2002 | Luttrell et al. | |
| 2003/0074476 A1 | 4/2003 | Kim et al. | |

OTHER PUBLICATIONS

InterDigital Comm. Corp., "16 bit UE ID Based UE Specific Masking for HS–SCCH," Discussion and Decision, 3GPP TSG RAN WG1#26, Kyung–Ju, Korea, May 13–17, 2002.

Siemens, "Simplified UE–ID Masking of HS–SCCH, Part 1," Discussion and Decision, TSG–RAN Working Group 1 #27, Oulu, Finland, Jul. 2–5, 2002.

InterDigital Comm. Corp., "16 bit UE ID based UE Specific Masking for HS–SCCH: Updated for consistency with new Rate matching for HS–SCCH," Discussion and Decision, 3GPP TSG RAN WG1#27, Olou, FInland, Jul. 2–5, 2002.

"$3^{rd}$ Generation Partnership Project: Technical Specification Group Radio Access Network; Multiplexing and channel coding (FDD) (Release 5)," 3GPP TS 25.212 v5. 1.0–DRAFT, Jun. 2002.

* cited by examiner

*Primary Examiner*—Emmanuel L. Moise
(74) *Attorney, Agent, or Firm*—Volpe and Koenig, P.C.

(57) ABSTRACT

A code is produce for use in scrambling or descrambling data associated with a high speed shared control channel (HS-SSCH) for a particular user equipment. A user identification of the particular user equipment comprises L bits. A ½ rate convolutional encoder processes at least the bits of the user identification by a ½ rate convolutional code to produce the code.

10 Claims, 2 Drawing Sheets

GENERATION OF USER EQUIPMENT IDENTIFICATION SPECIFIC SCRAMBLING CODE FOR THE HIGH SPEED SHARED CONTROL CHANNEL

This application claims priority to U.S. Provisional Application No. 60/378,170, filed May 13, 2002 and to U.S. Provisional Application No. 60/378,509, filed May 7, 2002.

BACKGROUND

The present invention relates to wireless communication systems. More particularly, the present invention relates to user equipment identification specific scrambling sequences for high speed shared control channels (HS-SCCH).

A high speed downlink packet access (HSDPA) is proposed for wideband code division multiple access communication systems. HSDPA allows for high downlink data rates to support multimedia services.

To support HSDPA, high speed shared control channels (HS-SCCHs) are used. The HS-SCCHs are used to signal vital control information to the user equipments (UEs). Each HS-SCCH has two parts, referred to as Part-1 and Part-2. Part-1 carries time critical information needed by the UE. This information includes the channelization code set and the modulation type used by the high speed physical downlink shared control channel (HS-PDSCH) which carries the HSDPA payload. This information is vital to support HSDPA, since HSDPA uses adaptive modulation and coding (AMC).

To obtain its Part-1 information, each HSDPA UE monitors up to four HS-SCCHs for its information. The information for a particular UE is distinguished from other UEs by its UE identification (UE ID) specific scrambling sequence. The UE processes each monitored HS-SCCH with its UE ID specific scrambling sequence to detect the HS-SCCH intended for the UE. After processing, the UE determines on which HS-SCCH, if any, information was carried using its scrambling sequence. The UE descrambles the data carried on Part-1 of its HS-SCCH using its scrambling sequence.

Until recently, a 10 bit UE ID was used as the basis for the UE ID specific scrambling sequence. In this case, this UE ID was converted into a 40 bit scrambling sequence. To turn the 10 bit UE ID into the 40 bit UE ID specific scrambling sequence, the 10 bit UE ID is processed by a Reed-Muller block to produce a 32 bit code. The first 8 bits of the produced code are repeated and appended onto the back of the 32 bit code to produce a 40 bit code.

Although it is proposed to extend the UE ID length to 16 chips, the current proposal for the HS-SCCHs uses a 10 bit UE ID. This UE ID is converted into a 40 bit scrambling sequence. To turn the 10 bit UE ID into the 40 bit scrambling sequence, the 10 bit UE ID is processed by a Reed-Muller block to produce a 32 bit code. The first 8 bits of the produced code are repeated and appended onto the back of the 32 bit code to produce a 40 bit code.

To reduce the occurrence of false detections, it is desirable to have good separation between the produced scrambling codes for each UE ID. Accordingly, it is desirable to have alternate approaches to producing scrambling codes.

SUMMARY

A code is produced for use in scrambling or descrambling data associated with a high speed shared control channel (HS-SSCH) for a particular user equipment. A user identification of the particular user equipment comprises L bits. A ½ rate convolutional encoder processes at least the bits of the user identification by a ½ rate convolutional code to produce the code.

DESCRIPTION OF THE PREFERRED EMBODIMENTS

Figure 1A:
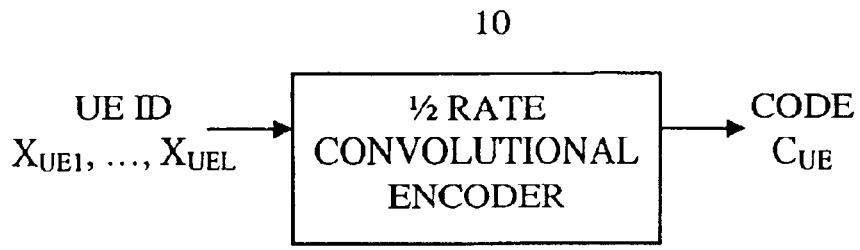
FIG. 1A is a preferred diagram of a circuit for producing a code associated with a particular user for a HS-SCCH.
Figure 1B:
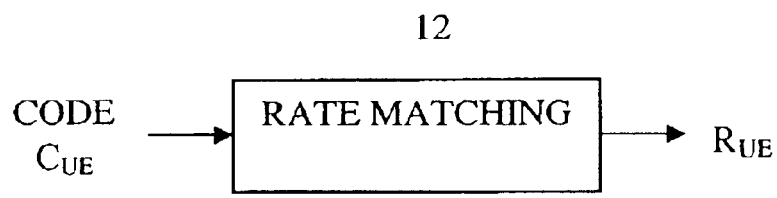
FIG. 1B is a diagram of a rate matching block used in conjunction with FIG. 1A.

Although the preferred embodiments are described in conjunction with the preferred application of the invention for use with the HSDPA of the third generation partnership project (3GPP) wideband code division multiple access (W-CDMA) communication system, the invention can be applied to other code division multiple access communication systems. FIGS. 1A and 1B are diagrams of a preferred UE ID specific scrambling sequence circuit. A UE ID, $X_{UE}$, of length L is input into the circuit. L can be any length, such as 8 bits, 10 bits, 16 bits, etc. The UE ID, $X_{UE} = \{X_{UE1}, \ldots, X_{UEL}\}$, is input into a ½ rate convolutional encoder 10 as shown in FIG. 1A. Along with the UE ID, extra bits, such as zeros, may be added to the end of the input string to extend the length of the input string and, accordingly, the output string. The use of a ½ rate convolutional encoder 10 provides for a high level of code separation between the output strings produced by different UE IDs. Additionally, current proposed 3GPP W-CDMA communication systems utilize a ½ rate convolutional encoder 10 for a forward error correction (FEC) technique. Accordingly, no additional hardware is required to generate the convolutionally encoded UE ID specific scrambling sequence. After encoding, based on the length of the output string, a rate matching stage 12 may be added to puncture bits to obtain a desired string length.

Figure 2A:
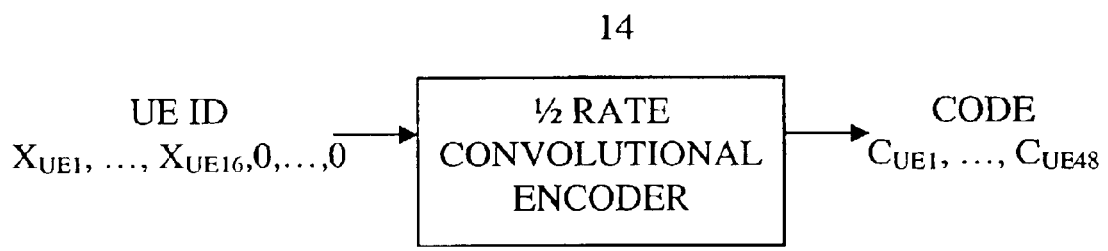
FIG. 2A is a preferred diagram of a circuit for producing a code associated with a user identification of 16 bits.
Figure 2B:
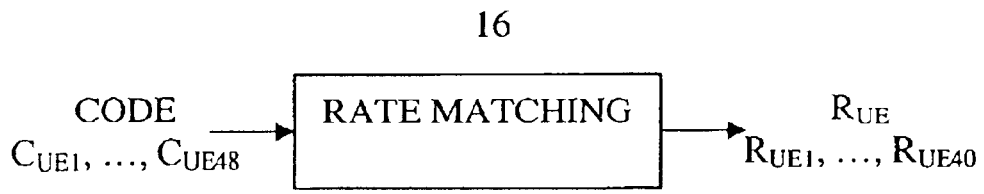
FIG. 2B is a diagram of a rate matching block used in conjunction with FIG. 2A.

FIGS. 2A and 2B are diagrams of preferred UE ID specific scrambling sequence circuit for a preferred UE ID codes of length 16, L=16. The 16 bit UE ID, $X_{UE} = \{X_{UE1}, \ldots, X_{UE16}\}$, is input into a ½ rate convolutional encoder 14 along with eight zero bits appended onto the end of the input string. As a result, the input string is $X_{UE1}, \ldots, X_{UE16}, 0, 0, 0, 0, 0, 0, 0, 0$. After being processed by the ½ rate convolutional encoder 14, the output code is 48 bits in length, $C_{UE} = \{C_{UE1}, \ldots, C_{UE48}\}$.

To reduce the length of the code to a preferred length of 40 bits, eight bits are preferably punctured. FIG. 2B illustrates the rate matching stage 16 to perform the puncturing. After the rate matching stage 16, the effective length of the scrambling code is 40 bits.

Figure 4:
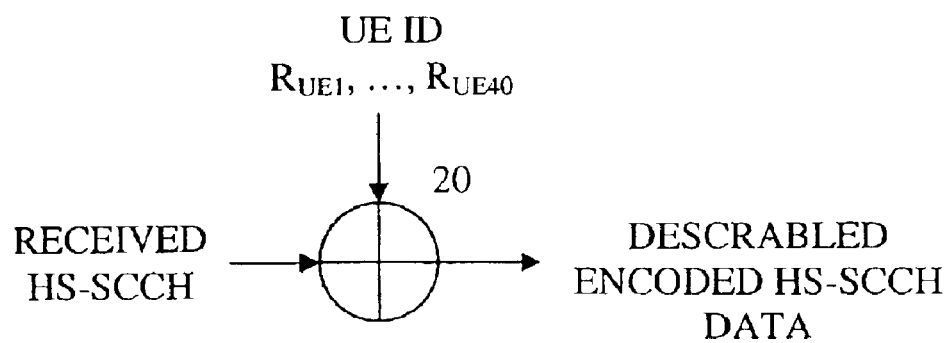
FIG. 4 is a simplified base station using the UE ID specific scrambling code.

FIG. 4 is a simplified diagram of a user equipment descrambling a HS-SCCH using the UE ID specific scrambling code. The UE ID scrambling code is mixed, such as by exclusive-or gate 18, with the received HS-SCCH for use in recovering the encoded HS-SCCH data.

Figure 3:
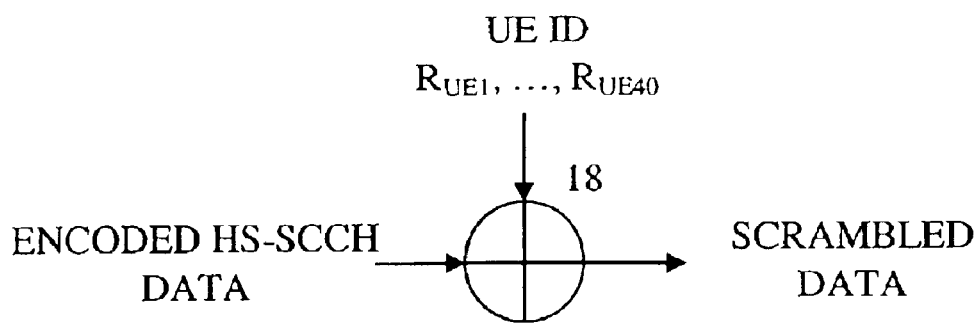
FIG. 3 is a simplified user equipment using the UE ID specific scrambling code.

FIG. 3 is a simplified diagram of a base station scrambling encoded data with the UE ID specific scrambling code for transfer over the HS-SCCH. The encoded data is mixed with the UE ID scrambling code, such as by an exclusive-or gate 20, for a particular user. The scrambled data is used to produce the HS-SCCH for transfer to the particular user.

What is claimed is:

1. An apparatus comprising:
   an input configured to accept a user identification comprising L bits; and
   a ½ rate convolutional encoder for processing at least the bits of the user identification by a ½ rate convolutional code to produce a code used for scrambling a high speed shared control channel (HS-SCCH).

2. The apparatus of claim 1 further comprising a rate matching block for puncturing bits after the production of the ½ rate convolutional code.

3. A user equipment comprising:
   an input configured to accept a 16 bit user identification; and
   a ½ rate convolutional encoder for processing the 16 bit user identification code with eight appended zero bits to produce a 48 bit code for use in descrambling a high speed shared control channel (HS-SCCH).

4. The user equipment of claim 3 further comprising a rate matching block for puncturing eight bits after the production of the 48 bit code.

5. A user equipment comprising:
   an input configured to accept a 16 bit user identification; and
   means for ½ rate convolutional encoding the 16 bit user identification code with eight appended zero bits to produce a 48 bit code for use in descrambling a high speed shared control channel (HS-SCCH).

6. The user equipment of claim 5 further comprising means for puncturing eight bits after the production of the 48 bit code.

7. A base station comprising:
   an input configured to accept a 16 bit user identification; and
   a ½ rate convolutional encoder for processing the 16 bit user identification code with eight appended zero bits to produce a 48 bit code for use in scrambling a high speed shared control channel (HS-SCCH) for a user equipment associated with the 16 bit user identification.

8. The base station of claim 7 further comprising a rate matching block for puncturing eight bits after the production of the 48 bit code.

9. A base station comprising:
   an input configured to accept a 16 bit user identification; and
   means for ½ rate convolutional encoding the 16 bit user identification code with eight appended zero bits to produce a 48 bit code for use in scrambling a high speed shared control channel (HS-SCCH) for a user equipment associated with the 16 bit user identification.

10. The base station of claim 9 further comprising means for puncturing eight bits after the production of the 48 bit code.

* * * * *

UNITED STATES PATENT AND TRADEMARK OFFICE
CERTIFICATE OF CORRECTION

PATENT NO. : 6,973,579 B2 Page 1 of 1
APPLICATION NO. : 10/187640
DATED : December 6, 2005
INVENTOR(S) : Dick et al.

It is certified that error appears in the above-identified patent and that said Letters Patent is hereby corrected as shown below:

TITLE PAGE, ITEM (56), OTHER PUBLICATIONS, page 1, right column, line 10, after "WG1#27," delete "Olou, FInland," and insert therefor --Oulu, Finland--.

IN THE ABSTRACT

TITLE PAGE, ITEM (57), line 1, after the word "is", delete "produce" and insert therefor --produced--.

IN THE DRAWINGS

FIG. 3, delete "DESCRABLED" and insert therefor --DESCRAMBLED--.

At column 1, line 67, before the words "for a", delete "(HS-SSCH)" and insert therefor --(HS-SCCH)--.

Signed and Sealed this

Twenty-second Day of August, 2006

JON W. DUDAS
*Director of the United States Patent and Trademark Office*